(12) United States Patent
Gelbmann et al.

(10) Patent No.: US 10,316,983 B2
(45) Date of Patent: Jun. 11, 2019

(54) VALVE

(71) Applicant: FESTO AG & Co. KG, Esslingen (DE)

(72) Inventors: Andre Gelbmann, Neidlingen (DE); Michael Kanthack, Wimsheim (DE); Julian Konrad, Reisbach (DE)

(73) Assignee: FESTO AG & CO. KG, Esslingen (DE)

( * ) Notice: Subject to any disclaimer, the term of this patent is extended or adjusted under 35 U.S.C. 154(b) by 55 days.

(21) Appl. No.: 15/127,865

(22) PCT Filed: Feb. 10, 2015

(86) PCT No.: PCT/EP2015/000274
§ 371 (c)(1),
(2) Date: Sep. 21, 2016

(87) PCT Pub. No.: WO2015/149898
PCT Pub. Date: Oct. 8, 2015

(65) Prior Publication Data
US 2017/0089485 A1    Mar. 30, 2017

(30) Foreign Application Priority Data

Mar. 31, 2014  (DE) .................. 10 2014 004 669

(51) Int. Cl.
*F16K 31/122*    (2006.01)
*F16K 1/10*       (2006.01)
*F16K 27/02*      (2006.01)

(52) U.S. Cl.
CPC ............ *F16K 31/1221* (2013.01); *F16K 1/10* (2013.01); *F16K 27/02* (2013.01)

(58) Field of Classification Search
CPC ........ F16K 31/1221; F16K 31/60; F16K 1/10; F16K 27/02; F27D 3/1536; B25B 27/24;
(Continued)

(56) References Cited

U.S. PATENT DOCUMENTS 3,290,003 A * 12/1966 Kessler .................... F16K 27/08
                                                  137/315.27
3,491,789 A *  1/1970 Callahan, Jr. ......... F16K 49/005
                                                     137/340
(Continued)

FOREIGN PATENT DOCUMENTS

DE      2444825    4/1976
DE     10336065    3/2005
(Continued)

*Primary Examiner* — Eric Keasel
*Assistant Examiner* — Andrew J Rost
(74) *Attorney, Agent, or Firm* — Hoffmann & Baron, LLP (57) ABSTRACT

A valve, having a valve housing, through which the process medium is able to flow, in which a valve seat surrounding a through-flow opening is arranged, a valve member arranged on a spindle being assigned to said valve seat such that the valve member is movable by an adjusting travel of the spindle between a shut-off position, in which the valve member bears in a sealing manner against the valve seat so as to be impermeable to the process medium, and an open position, in which the valve member is lifted from the valve seat, and having a valve drive, which has a drive housing and a drive member that is arranged in the drive housing and generates the adjusting travel of the spindle, wherein the drive housing is coupled to the valve housing via an external interface and the drive member is coupled to the spindle via an internal interface.

15 Claims, 4 Drawing Sheets

(58) Field of Classification Search
CPC ......... Y10T 137/0519; Y10T 137/0514; Y10T 137/0502; Y10T 137/0497; Y10T 137/0491
USPC ....... 251/63.5, 291; 137/15.24, 15.23, 15.21, 137/15.19, 15.18
See application file for complete search history.

(56) References Cited

U.S. PATENT DOCUMENTS

| | | | | |
|---|---|---|---|---|
| 4,712,576 | A * | 12/1987 | Ariizumi ............... | F16K 31/003 137/270 |
| 5,288,052 | A * | 2/1994 | Black .................. | F16K 31/1262 137/556.3 |
| 5,351,936 | A * | 10/1994 | Tanikawa ................ | F16K 41/10 251/122 |
| 7,677,530 | B2 * | 3/2010 | Hasunuma ................ | F16K 1/06 251/122 |

FOREIGN PATENT DOCUMENTS

| | | |
|---|---|---|
| DE | 102007002153 | 12/2007 |
| DE | 202008005469 | 8/2008 |
| DE | 102012007739 | 10/2013 |
| DE | 102013106500 | 12/2013 |
| EP | 0277309 | 8/1988 |
| EP | 0897076 | 2/1999 |
| EP | 1544526 | 6/2005 |
| WO | WO2007118674 | 10/2007 |

\* cited by examiner

VALVE

This application claims priority based on an International Application filed under the Patent Cooperation Treaty, PCT/EP2015/000274, filed Feb. 10, 2015, which claims priority to DE102014004669.9, filed Mar. 31, 2014.

BACKGROUND OF THE INVENTION

The invention relates to a valve, having a valve housing through which the process medium is able to flow, in which a valve seat surrounding a through-flow opening is arranged, a valve member arranged on a spindle being assigned to said valve seat such that the valve member is movable by means of an adjusting travel of the spindle between a shut-off position, in which the valve member bears in a sealing manner against the valve seat so as to be impermeable to the process medium, and an open position, in which the valve member is lifted from the valve seat, and having a valve drive, which has a drive housing and a drive member that is arranged in the drive housing and generates the adjusting travel of the spindle, wherein the drive housing is coupled or couplable to the valve housing via an external interface and the drive member is coupled or couplable to the spindle via an internal interface.

Valves are already known, which have what is referred to as a divided spindle, wherein the first spindle part is assigned to the valve housing equipped with the valve member. The two spindle parts are connected with each other via shells, which must be actuated for their part via an assembly tool. It is required for this to initially connect the drive housing with the valve housing, whereby the two spindle parts are brought into convergence with each other. Then the connection of the spindle parts takes place by means of the shells.

SUMMARY OF THE INVENTION

The problem addressed by the invention is to create a valve of the type mentioned at the outset, in which the valve drive can be coupled to the valve housing in simple manner.

This problem is solved by a valve with the features of independent claim 1. Further developments of the invention are described in the sub-claims.

The valve according to the present invention is characterised in that the external interface is assigned first actuating means and the internal interface is assigned second actuating means such that the actuation of the first actuating means in order to couple or uncouple the drive housing and the valve housing causes an actuation of the second actuating means in order to couple or uncouple the drive member and spindle.

During the actuation of the external interface the internal interface is therefore automatically actuated. It is therefore no necessary, for example, to initially connect the drive housing with the valve housing and then to couple the spindle with the drive member as is known from the prior art, but rather the coupling of the drive housing and valve housing causes the coupling of the drive member and spindle.

In the case of a further development of the invention the first actuating means on the external interface have an interface part on the drive side and an interface part on the fluid side, which can be brought into engagement with each other in order to couple the drive housing and valve housing in an engaged position and can be transferred from the engaged position into an end position, in which the drive housing and valve housing are fixed together. The uncoupling can then occur through transfer of both interface parts from the end position to the engaged position.

In an especially preferable manner the two interface parts are designed and positioned in the engaged position relative to each other in such a manner that the end position can be reached through a relative movement of the two interface parts relative to each other. If the valve housing, for example, is installed in a pipeline system for the transport of process medium, then advantageously only the interface part on the drive side is moved, while the interface part on the fluid side remains installed in a stationary manner in the pipeline system.

It is possible, that the interface part on the drive side is designed as a component separate from the remainder of the drive housing. The interface part on the drive side can be designed, for example, as a sleeve or pipe section, which is connected torque-proof with the remainder of the drive housing. The interface part on the drive side can, for example, be welded on the remainder of the drive housing. Alternatively, however, it is also possible, that the interface part on the drive side is integrally formed on another component of the drive housing, for example, to a cover of the drive housing on the front surface.

It is possible, that the interface part on the fluid side is designed as a component separate from the remainder of the valve housing. The interface on the fluid side is preferably designed hollow cylindrically. Advantageously the interface part on the fluid side can be detachably fastened to the remainder of the valve housing, so that it can be replaced as required. For example, a threaded connection is suitable for the detachable connection with the remainder of the valve housing.

In an especially preferable manner the interface part on the drive side and the interface part on the fluid side can be screwed together by means of a threaded connection with internal and external threads corresponding to each other. Advantageously the drive housing with the interface part on the drive side is therefore screwed to the valve housing with the interface part on the fluid side.

Advantageously the external thread is located on the interface part on the drive side and the internal thread on the interface part on the fluid side. However, a reverse arrangement is also conceivable with the external thread on the interface part on the fluid side and the internal thread on the interface part on the drive side.

Alternatively, for the threaded connection the two interface parts can also be connected with each other by other easily detachable types of connection. Here, for example a plug connection is suitable.

In a further development of the invention the second actuating means on the internal interface have an interface section on the drive side and an interface section on the fluid side, which can be brought into engagement with each other in order to couple the drive member and spindle in a coupling position and can be transferred from the coupling position into a locking position, in which the drive member and the spindle are locked together. If the two interface sections are located in the locking position then the drive member and the spindle are inextricably connected with each other. To detach the drive member from the spindle, for example, in the event that the valve drive is replaced, the two interface sections must initially be transferred into the coupling position. It is then possible to detach them in this coupling position.

In an especially preferable manner the two actuating means have at least one locking element, which prevents a detachment of the drive member and spindle in the locking position.

Advantageously, the interface section on the drive side is formed on the drive member.

The interface section on the fluid side can be formed on the spindle.

However, in principle, it would be possible, that the interface section on the drive side and/or on the fluid side in each case is formed on components formed separately from the drive member and/or the spindle, which for their part in each case are connected with the drive member or the spindle.

In an especially preferable manner the interface section on the drive side and the interface section on the fluid side are located in the engaged position of the interface part on the drive side and the interface part on the fluid side in the coupling position. Advantageously, the two interface sections are located in the locking position after transfer of the two interface parts into the end position.

In the case of a further development of the invention the interface section on the drive side and interface section on the fluid side can be detachably coupled with each other by means of a quick coupling. The quick coupling can, for example, be a quick plug coupling.

It is possible, that the quick coupling has several coupling elements movably mounted radially in respect to a longitudinal axis running through the spindle and drive member and an engagement structure, in which the coupling elements engage in the coupling position of the two interface sections.

Advantageously, the coupling elements are designed as coupling balls. The engagement structure can have an annular groove.

Advantageously, the annular grove is formed on the interface section on the fluid side, while the coupling balls are arranged on the interface section on the drive side.

In a further development of the invention the locking element is designed as a locking sleeve, which envelops the coupling balls, wherein the locking element is mounted movably relative to the coupling balls and has an annular bearing groove, which is located in the coupling position on the same level as the coupling balls plunging into the annular groove, and has a locking section, which is located in the locking position at the level of the coupling balls and prevents a shifting of the coupling balls radially outwards except for the engagement with the annular groove. The locking element is advantageously connected in a stationary manner with the drive housing, for example, pressed into a tubular connection piece of the drive housing. The coupling balls can thereby run on the internal surface of the locking sleeve.

In an especially preferable manner the internal interface in the case of a closed external interface is arranged in a chamber closed to the environment. The external interface is advantageously sealed in the closed condition, therefore, if the two interface parts are in the end position, whereby the entry of dirt into the area of the internal interface is prevented.

In the case of a further development of the invention the valve drive is designed as in particular a fluid linear drive. However, in principle a fluid rotary drive, for example, would also be conceivable, in which then the rotatory drive movement can be translated via converting means into the adjusting travel of the spindle.

A fluid, in particular pneumatic piston drive can be provided as a fluid linear drive. The pneumatic piston drive can, for example, have a single- or double-acting work cylinder.

Advantageously, the pneumatic piston drive has a drive member in the form of a drive piston which can be pressurised with compressed air and a piston rod connected with the drive piston, on which the interface section on the drive side is located.

BRIEF DESCRIPTION OF THE DRAWINGS

A preferred embodiment of the invention is depicted in the drawing and is explained in detail below. In the drawing.

DETAILED DESCRIPTION OF THE PREFERRED EMBODIMENTS

FIGS. 1 to 4 show a preferred embodiment of the valve 11 according to the present invention. The valve 11 is suitable to being used as a process valve in the process industry. Below the valve 11 according to the present invention is explained exemplarily by means of what is referred to as an angle seat valve. However, the invention can also be applied to a straight seat valve or diaphragm valve.

As depicted in particular in FIGS. 1 to 4, the valve 11 has a valve housing 12, in which a through-flow channel 15 extends between an inlet 13 and an outlet 14.

In the event of a use in the food industry the valve housing 12 advantageously consists of stainless steel. If aggressive substances, for example, acid are used as process media, the valve housing 12 advantageously consists of plastic material, which has a greater chemical resistance to such substances.

A through-flow opening 16, which is surrounded by an annular valve seat 17 is located in the through-flow channel 15 between the inlet 13 and the outlet 14. Advantageously, the valve seat 17 is designed circularly. Theoretically, however, an oval form of the valve seat 17 would also be conceivable.

A valve member 18 is assigned to the valve seat 17, which valve member is arranged for its part on a spindle 19.

The valve member 18 is shown in several parts purely as an example and in this case has a plate 20, which is provided with a feedthrough hole 21, through which an end section 22 of the spindle 19 can be plugged. The plate 20 is, for example, welded with the spindle 19. The valve member 18 also includes a counterpart 23, which is provided with a blind hole-like receiving opening 24, which is provided with an internal thread. Complementary thereto an external thread is located on the end section 22 of the spindle 19, whereby the counterpart 23 can be screwed on the end section 22 of the spindle 19. Between the counterpart 23 and the plate 20 an annular seal ring 27 is clamped, which advantageously consists of plastic material, for example, PTFE.

The valve member 18 is movable by means of an adjusting travel of the spindle 19 between a shut-off position, in which the valve member 18 bears against the valve seat 17 with its seal ring 27 impermeable to fluid, and an open position (FIG. 4), in which the valve member 18 is lifted from the valve seat 17. The adjusting travel of the spindle 19 is generated by a valve drive 28, which can be coupled to the valve housing 12 in a manner explained in more detail below.

The valve drive 28 is shown in FIGS. 1 to 4 exemplarily by means of a fluid linear drive in the form of a pneumatic piston drive. The valve drive 28 has a drive housing 29. The drive housing 29 has a hollow-cylindrical housing body 30, which is closed on the end side with in each case a housing cover 31, 32, which is impermeable to fluid. The housing body 30 can consist of aluminium, for example, be designed as an aluminium extrusion. If necessary, the aluminium housing body 30 can be covered with a stainless steel shell. Alternatively, however, it would also be conceivable to design the housing body 30 as a stainless steel part.

The two housing covers 31, 32 and the housing body 30 define a working space 33, in which a drive piston 34 is movably guided and divides the working space 33 into two piston chambers 34, 35. In the example case, a single-acting piston drive is depicted, in which one of the two piston chambers 34 can be pressurised with compressed air, while in the other piston chamber 35 at least one, the example case two restoring springs 37*a*, 37*b* are arranged. In the process, the arrangement is selected such that the restoring springs 37*a*, 37*b* press the drive pistons 36 downwards in the vented first piston chamber 34, whereby the coupled spindle 19 and the valve member 18 connected therewith is pressed onto the valve seat 17. Such a design is also referred to as normally closed. If the first piston chamber 34 is pressurised with compressed air, then the drive piston 36 is pressed upwards contrary to the restoring force of the restoring springs 37*a*, 37*b*, whereby ultimately the valve member 18 is lifted from the valve seat 17.

The drive piston 36 is designed plate-shaped and is firmly connected with a piston rod 38, which protrudes via a passage opening 39 through the drive piston 36. The drive piston 36 is divided in the example case into several annular cylinder sections 41*a-c* staggered behind each other in the axial direction along a longitudinal axis 40 running through the piston rod 38 and spindle 19, which cylinder sections differ from each other in their respective external diameter. The first cylinder section 41*a* has the largest external diameter and bears with its shell surface against the internal wall of the housing body 30. In the shell surface of the first cylinder section 41*a* an annular sealing groove 42 is formed, in which a sealing ring 43 consisting in particular of plastic material is received. The sealing ring 43 ensures a dynamic sealing between the shell surface of the first cylinder section 41*a* of the drive piston 36 and the internal surface of the housing body 30. On the front surface of the first cylinder section 41 turned away from the first piston chamber 34 the first restoring spring 37*a* is supported, which is supported on the other hand on the first housing cover 31.

On the first cylinder section 41*a* of the drive piston 36 a second cylinder section 41*b* is connected, which has a smaller external diameter. On the front surface there, which is turned away from the first piston chamber 34, the second restoring spring 37*b* is supported, which is also supported on the other hand on the first housing cover 31. Finally, a third cylinder section 41*c*, in which the passage opening of the piston rod 38 is formed, is connected in the axial direction to the second cylinder section 41*b*.

The piston rod 38 protrudes with a first piston rod section 44*a* into the second piston chamber 35, while a first piston rod section 44 pushes through the first piston chamber 34 and is led out of the drive housing 29 via a cylindrical passage channel 45 formed in the second housing cover 32. The second housing cover 32 has a base section 46, which is connected, for example, welded there, impermeable to fluid with the housing body 30. On this side a first extension 47 is connected to the base section 46 of the second housing cover 32, which extension protrudes into the first piston chamber 34, wherein on the other side of the base section 46 a second cylindrical extension 48 is formed, which protrudes from the drive housing 29 downwards.

The drive housing 29 is couplable or coupled with the valve housing 12 via an external interface 49. The drive member is couplable or coupled together with the spindle 19 via an internal interface 50. The first actuating means is assigned to the external interface 49 and the second actuating means is assigned to the internal interface 50 such that the actuation of the first actuating means in order to couple or uncouple drive housing 29 and valve housing 12 causes an actuation of the second actuating means in order to couple or uncouple the drive member and spindle 19.

The first actuating means on the external interface 49 have an interface part 51 on the drive side, which is designed in respect to the remainder of the drive housing 29 as a separate component. The interface part 51 on the drive side is designed sleeve-like and is put on the second cylindrical extension 48 of the first housing cover 32 and is firmly connected there, in particular welded on there, with the second cylindrical extension 48. The interface part 51 on the drive side can be brought into engagement in an engaged position 53 with an interface part 52 on the fluid side. For this purpose the interface part 51 on the drive side has a hollow-cylindrical fastening section 54, on the shell surface of which an external thread 55 is formed. In the axial direction a base section 56 with a larger diameter is connected to the fastening section 54. The transition between the fastening section 54 and the base section 56 forms an annular stop surface 57 lying in a radial plane.

The interface part 52 on the fluid side is designed hollow-cylindrically and has several functional sections. One of these functional sections is a cylindrical fixing section, on the shell surface of which an external thread 55 is formed. An internal thread 60 formed on a fixing connecting piece 58 of the valve housing 12, whereby the interface part 52 can be screwed into the valve housing 12, corresponds with said external thread. Thus, a disassembly of the interface part 52 from the valve housing 12 is also possible. In the case of a smaller nominal size it is possible, that interface part 52 and valve housing 12 are designed as a single-piece component, which consists, for example, of cast material.

The interface part 52 on the fluid side also has a fastening area 59 assigned to the fastening section 54 on the interface part 51 on the drive side, on the internal wall of which an internal thread 60 is formed. The front surface of the fastening area 59 forms a counter stop surface 61, which is assigned to the stop surface 57 on the interface part 51 on the drive side.

The interface part 51 on the drive side and with this the entire drive housing 29 can therefore be screwed into the interface part 52 on the fluid side, whereby drive housing 29 and valve housing 12 are coupled together. In the screwing-in of the interface part 51 on the drive side an end position 62 is reached, which is defined by the stop of both the stop surface and counter-stop surface 61 corresponding to each other.

The two actuating means on the internal interface 50 have an interface section on the drive side, which is located on the second piston rod section 44*b*.

Figure 2:
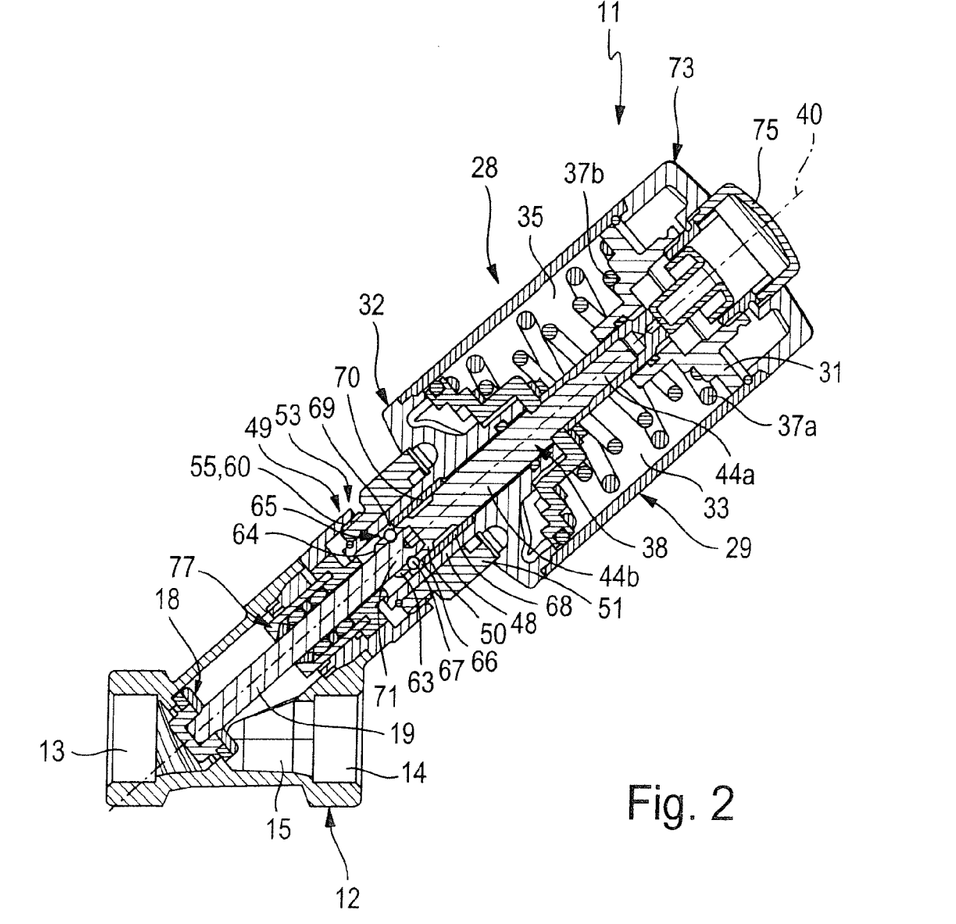
FIG. 2 shows a longitudinal section through the valve of FIG. 1, wherein the two interface parts of the external interface are in the engaged position and the two interface sections of the internal interface are in the coupling position.
Figure 3:
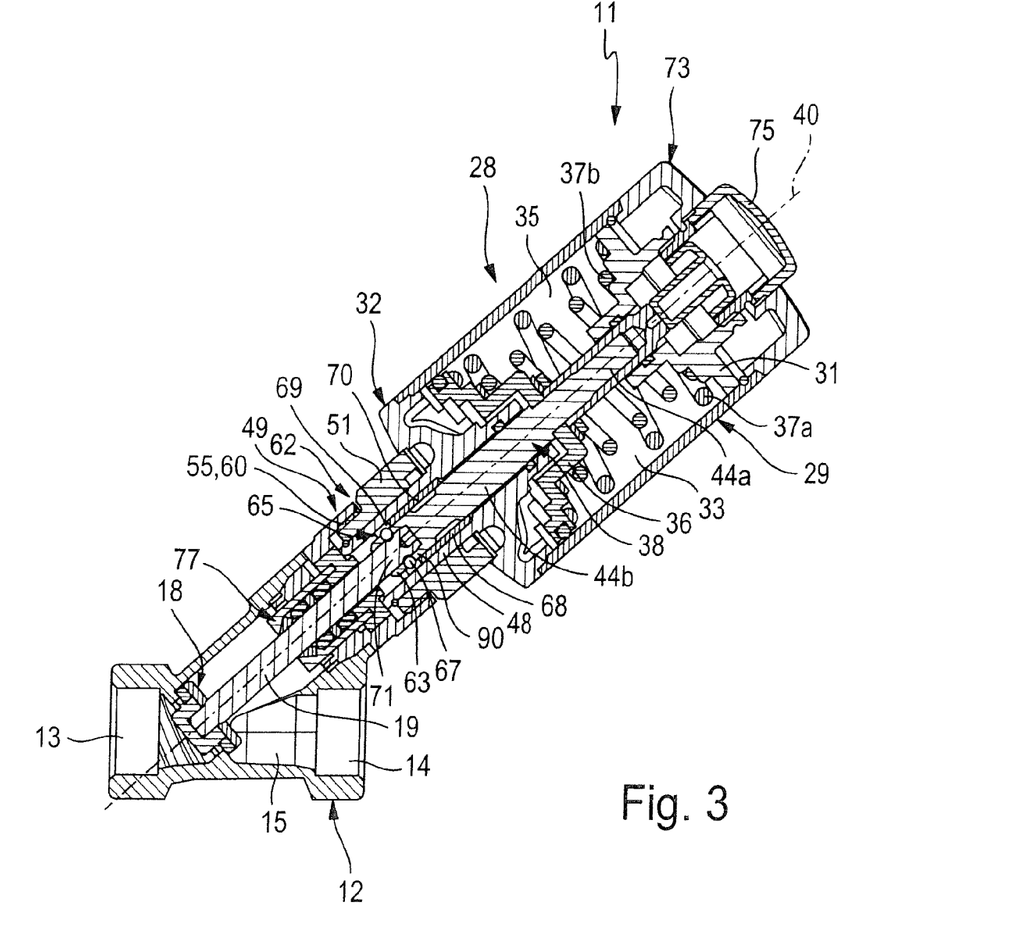
FIG. 3 shows a longitudinal section through the valve according to FIG. 1, in which the external and internal interface s are completely coupled with each other and the two interface parts of the external interface are in the end position and the two interface sections of the internal interface are in the locking position
Figure 4:
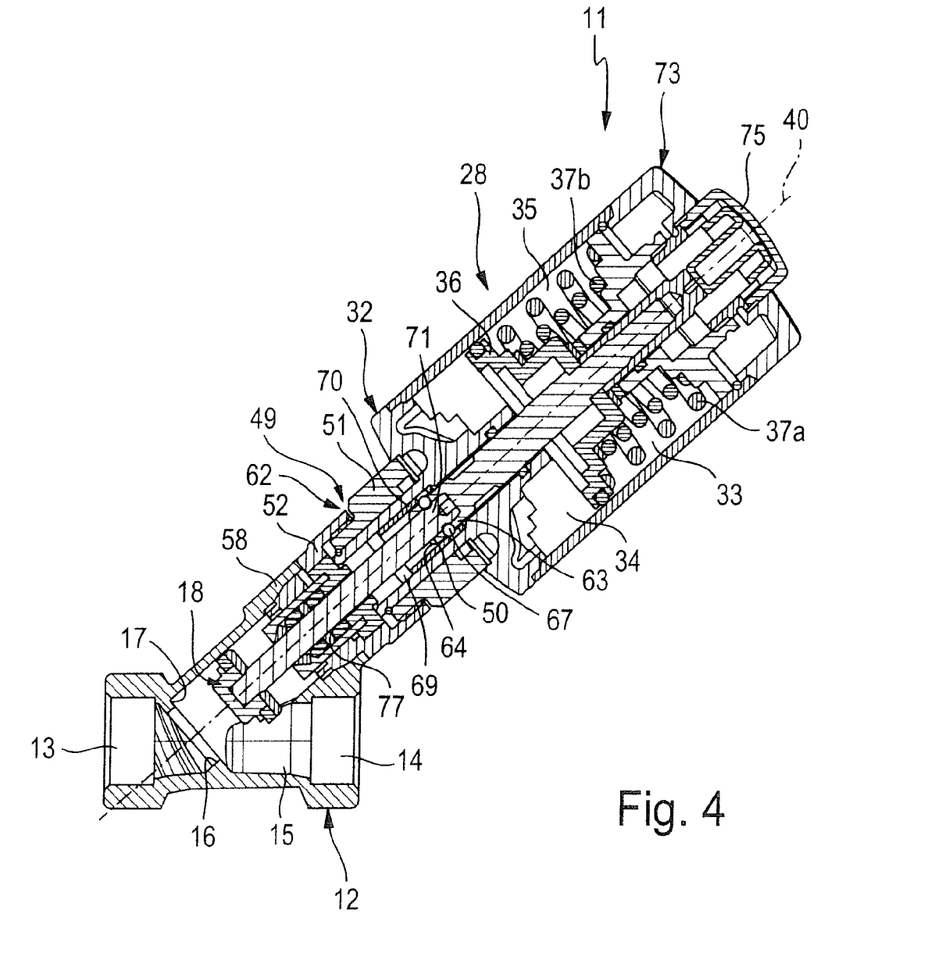
FIG. 4 shows a longitudinal section through the valve from FIG. 3 with the difference, that the spindle is lifted from the valve seat.

As depicted in particular in FIGS. 2 to 4, a spindle receptacle 64 designed blind-hole-like is located on the free end of the second piston rod section 44*b* for the reception of the free spindle end opposite the spindle end equipped with the valve member 18.

The spindle receptacle 64 is part of a quick coupling 65 for connecting the drive member and spindle 19. The shell surface of the spindle receptacle 64 is provided with several bearing openings 66 arranged behind in each other in the circumferential direction, which in each case extend in the radial direction through the wall of the shell surface of the spindle receptacle 64. A coupling element in the form of a coupling ball 67 is assigned to each bearing opening 66. At the same time, the opening cross section of the bearing openings 66 on the internal surface of the spindle receptacle 64 is smaller than the diameter of the coupling balls 76, so that the coupling balls 67 are prevented from being able to fall out radially inwards through the bearing openings 66 and from the spindle receptacle 64. However, the opening cross section on the internal surface of the spindle receptacle 64 is designed such that a ball section of a respective coupling ball 67 can protrude through the opening cross section on the internal surface of the spindle receptacle.

A locking element in the form of a locking sleeve 68 is also assigned to the interface section 63 on the drive side, which is arranged in the radial direction between the external surface of the second piston rod section 44*b*, therefore, the external surface of the interface section 63 on the drive side and the internal surface of the second cylindrical extension 48 of the second housing cover 32. Advantageously, the locking sleeve 68 is produced from wear-resistant material, since on its internal surface the coupling balls 67 roll off during the coupling and uncoupling of the drive member and spindle 19 and also during the adjusting travel of the spindle 19. The locking sleeve 68 is connected, for example, pressed in there, with the internal surface of the second cylindrical extension 48.

The locking sleeve 68 has two characteristic functional sections. An annular bearing groove 69 is provided, which is effective in the manner explained in more detail below. A locking section 70 is connected in the axial direction to the annular bearing groove 69, which locking section has a smaller internal diameter compared to the bearing groove 69.

The second actuating means on the internal interface also have another interface section 71 on the fluid side, which is located on the spindle 9. The interface section 7 on the fluid side is in the area of the second spindle end, which is arranged opposite the first spindle end equipped with the valve member 18.

The interface section 71 on the fluid side has an engagement structure, which also like the functional section of the locking sleeve 68 are components of the quick coupling 65. The engagement structure has an annular groove 72.

Figure 1:
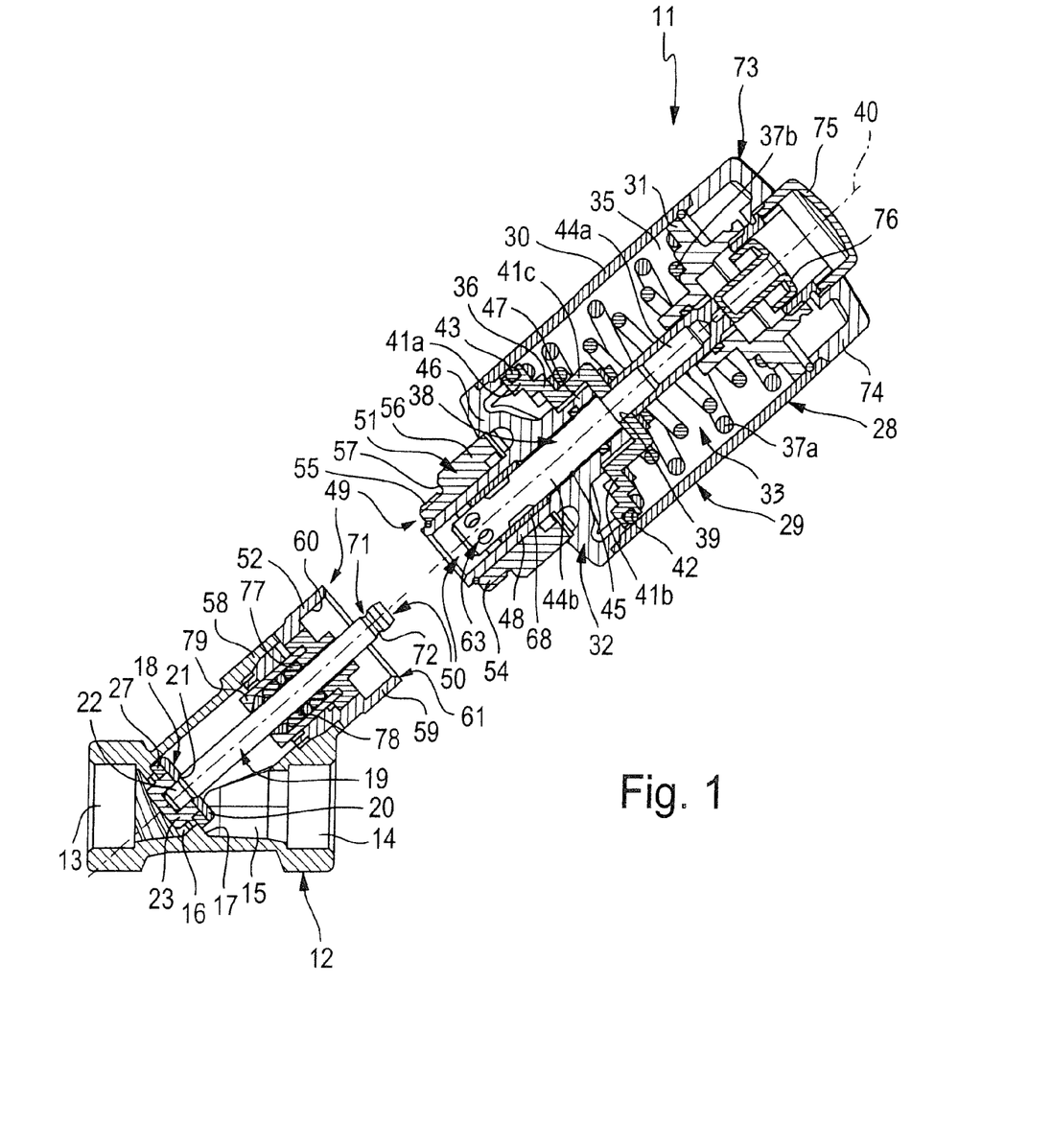
FIG. 1 shows a longitudinal section through a preferred embodiment of the valve according to the present invention with a separate external and internal interface.

As depicted, for example, in FIG. 1, the drive housing 29 on the housing end, which is arranged opposite the two interfaces 49, 50, has a functional module, which is depicted here exemplarily as display cover 73. The display cover 73 has a base section 74, which is designed bonnet-like, put on the housing body 30 of the drive housing 29 and is connected there with the housing body 30. The base section 74, therefore, arches over the second housing cover 32. The display cover 73 also has in addition to the base section 74 a bonnet-like viewing element, for example, made from glass material. The viewing element 75 permits the viewing of a functional section of the drive member, namely of the first piston rod section 44*a* and a display element 76 arranged there. Depending on whether the spindle 19 is lifted from the valve seat 17 or is kept impermeable to the process medium in abutment to the valve seat 17, the display element 76 is moved more or less far in the direction of the viewing element 75. From the position of the display element 76 it can be deduced, whether the valve member 18 is in the closed or in the open position.

A sealing device 77 reached through by the spindle 19, which has a sealing arrangement 78 preloaded by spring means, comprising under seal sealing means bearing against the spindle 19, is also part of the valve 11. The sealing device 77 is included in a seal cartridge 79 separate from the valve housing 12, which is designed as a pre-assembled assembly ready for operation.

For the coupling, the drive housing 29 with the interface part 51 on the drive side is introduced in advance to the interface part 52 on the fluid side on the valve housing 12. The external thread 55 formed on the interface part 51 on the drive side thereby comes into contact in the engaged position 53 with the internal thread 60 formed on the interface part 52 on the fluid side. At the same time, the interface section 71 on the fluid side runs into the spindle receptacle 64 on the free end of the spindle 19. Upon running-in, the coupling balls 67 can initially be shifted radially outwards, since they are at the level of the annular bearing groove 69. The spindle 19 runs in until the front surface abuts against the underside of the spindle receptacle 64. In this reception position the annular groove 72 on the spindle 19 is positioned at the same level with the annular bearing groove 69 on the piston rod 38.

Next, the drive housing 29 is now screwed onto the valve housing 12, in which the external thread 55 on the interface part 51 on the drive side and internal thread 60 on the interface part 52 on the fluid side are screwed together. The screw-in depth of the interface part 51 on the drive side is determined both by the stop surface 57 or the counter-stop surface 71, which correspond with each other. Upon the mutual stop of the two surfaces, the interface part 51 on the drive side and the interface part 52 on the fluid side are located in the end position 62.

Upon the screwing-in of the interface part 51 on the drive side, the spindle 19 and the drive member in the form of the piston rod 38 are automatically locked together. As a result of the fact that the spindle is held with its valve member 18 in abutment with the valve seat 17, an axial shift of the spindle 19 and piston rod 38 unit during the screwing-in of the interface part 51 on the drive side is prevented, that is, the spindle 19-piston rod 38 unit remains stationary. The interface part 51 on the drive side and with this the second cylindrical extension 48 on the second housing cover and the locking sleeve 68 pressed in there move, however, relative to the spindle 19-piston rod 38 unit, such that now during the further screwing-in the locking section 70 of the locking sleeve 68 and no longer the annular bearing groove 79 is arranged radially outside of the coupling balls 76. The locking section 70 prevents the coupling balls 67 from being able to shift radially and presses the coupling balls 67 into the annular groove 72 on the spindle 19. If the end position of interface part 51 on the drive side and interface part 52 on the fluid side is reached, interface section 63 on the drive side and interface section 71 on the fluid side, that is, spindle 19 and piston rod 38 are locked together and can no longer be detached from each other.

During the subsequent adjusting travel of the spindle, which is caused by the pressurisation of the first piston chamber 34, the coupling balls 65 roll off exclusively on the locking section 70 of the locking sleeve 78.

The invention claimed is:

1. A valve, having a valve housing, through which a process medium is able to flow, in which a valve seat surrounding a through-flow opening is arranged, a valve member arranged on a spindle being assigned to said valve seat such that the valve member is movable by means of an adjusting travel of the spindle between a shut-off position, in which the valve member bears in a sealing manner against the valve seat so as to be impermeable to the process medium, and an open position, in which the valve member is lifted from the valve seat, and having a valve drive, which has a drive housing and a drive member that is arranged in the drive housing and generates the adjusting travel of the spindle, wherein the drive housing is coupled or couplable to the valve housing via an external interface and the drive member is coupled or couplable to the spindle via an internal interface, and wherein the external interface is assigned first actuating means and the internal interface is assigned second actuating means such that the actuation of the first actuating means, in order to couple or uncouple the drive housing and the valve housing, causes an actuation of the second actuating means in order to couple or uncouple the drive member and spindle.

2. The valve according to claim 1, wherein the first actuating means on the external interface have an interface part on the drive side and an interface part on the fluid side, which can be brought into engagement with each other in order to couple the drive housing and valve housing in an engaged position and can be transferred from the engaged position into an end position, in which the drive housing and valve housing are fixed together.

3. The valve according to claim 2, wherein the two interface parts are designed and positioned relative to each other in the engaged position such that the end position can be reached through a relative motion of the two interface parts relative to each other.

4. The valve according to claim 2, wherein the interface part on the drive side is designed as a component separate from the remainder of the drive housing.

5. The valve according to claim 2, wherein the interface part on the fluid side is designed as a component separate from the remainder of the valve housing.

6. The valve according to claim 2, wherein the interface part on the drive side and the interface part on the fluid side can be screwed together by means of a thread connection with internal- and external threads corresponding to each other, wherein the external thread is formed on the interface part on the drive side and the internal thread is formed on the interface part on the fluid side.

7. The valve according to claim 2, wherein the second actuating means on the internal interface have an interface section on the drive side and an interface section on the fluid side, which can be brought into engagement with each other in order to couple the drive member and spindle in a coupling position and can be transferred from the coupling position into a locking position, in which the drive member and spindle are locked together, wherein the second actuating means have at least one locking element, which prevents a detachment of the drive member and spindle in the locking position.

8. The valve according to claim 7, wherein the interface section on the drive side is formed on the drive member.

9. The valve according to claim 7, wherein the interface section on the fluid side is formed on the spindle.

10. The valve according to claim 7, wherein, in the engaged position of the interface part on the drive side and the interface part on the fluid side, the interface section on the drive side and the interface section on the fluid side are in the coupling position and are in the locking position after transfer of the two interface parts into the end position.

11. The valve according to claim 7, wherein the interface section on the drive side and the interface section on the fluid side are detachably couplable with each other by means of a quick coupling, wherein the quick coupling has several coupling elements and an engagement structure movably mounted radially in respect to a longitudinal axis running through the spindle and the drive member, in which the coupling elements engage in the coupling position of the two interface sections.

12. The valve according to claim 11, wherein the coupling element is designed as coupling balls and the engagement structure has an annular groove, wherein the annular groove is formed on the interface section on the fluid side and the coupling balls are arranged on the interface section on the drive side.

13. The valve according to claim 12, wherein the locking element is designed as a locking sleeve, which envelops the coupling balls, wherein the locking element is movably mounted relative to the coupling balls and has an annular bearing groove, which is located in the coupling position on the same level as the coupling balls plunging into the annular groove, and has a locking section, which is in the locking position on the level of the coupling balls and prevents a shifting of the coupling balls radially outwards except for the engagement with the annual groove.

14. The valve according to claim 1, wherein the internal interface in the case of a closed external interface is arranged in a chamber closed to the environment.

15. The valve according to claim 1, wherein the valve drive is designed as a fluid linear drive, wherein a pneumatic piston drive has as a fluid linear drive a drive member in the form of a drive piston pressurised with compressed air and a piston rod connected with the drive piston, on which piston rod the interface section on the drive side is formed.

* * * * *